United States Patent

Rein et al.

(10) Patent No.: US 12,053,782 B2
(45) Date of Patent: Aug. 6, 2024

(54) APPARATUS FOR DETERMINING PROPERTIES OF A LABORATORY SAMPLE CONTAINER, LABORATORY AUTOMATION SYSTEM AND METHOD FOR DETERMINING PROPERTIES OF A LABORATORY SAMPLE CONTAINER

(71) Applicant: Roche Diagnostics Operations, Inc., Indianapolis, IN (US)

(72) Inventors: Michael Rein, Fellbach (DE); Benjamin Sauer, Ludwigsburg (DE)

(73) Assignee: ROCHE DIAGNOSTICS OPERATIONS, INC., Indianapolis, IN (US)

( * ) Notice: Subject to any disclaimer, the term of this patent is extended or adjusted under 35 U.S.C. 154(b) by 505 days.

(21) Appl. No.: 17/095,868

(22) Filed: Nov. 12, 2020

(65) Prior Publication Data

US 2021/0146368 A1 May 20, 2021

(30) Foreign Application Priority Data

Nov. 15, 2019 (EP) .................................... 19209352

(51) Int. Cl.
*B01L 3/00* (2006.01)
*G01N 21/88* (2006.01)
*G01N 21/90* (2006.01)

(52) U.S. Cl.
CPC .......... *B01L 3/545* (2013.01); *G01N 21/8806* (2013.01); *G01N 21/90* (2013.01); *B01L 2300/021* (2013.01)

(58) Field of Classification Search
CPC ............... B01L 3/545; B01L 2300/021; G01N 21/8806; G01N 21/90
See application file for complete search history.

(56) References Cited

U.S. PATENT DOCUMENTS

| 4,664,525 A | 5/1987 | Tagaya |
| 5,233,186 A * | 8/1993 | Ringlien ................ G01N 21/90 250/223 B |

(Continued)

FOREIGN PATENT DOCUMENTS

| DE | 102011078833 | 1/2013 |
| JP | S56-033610 A | 9/1982 |

(Continued)

OTHER PUBLICATIONS

Koga, Fumitaka, A New Inspection Technique for Through Holes of Printed Wiring Boards, Reports of Research from Fukuoka Industrial Technology Center, 2009, pp. 119-122, vol. 19, Japan.

*Primary Examiner* — Jill A Warden
*Assistant Examiner* — Alex Ramirez
(74) *Attorney, Agent, or Firm* — Woodard, Emhardt, Henry, Reeves & Wagner, LLP

(57) ABSTRACT

An apparatus for determining properties of a laboratory sample container is presented. The apparatus comprises a light source for emitting light to illuminate the laboratory sample container and a number of curved reflecting and/or scattering units. A respective curved reflecting and/or scattering unit comprises a curved shape and is adapted to reflect and/or scatter light of the light source to an outer surface of the laboratory sample container for illuminating the laboratory sample container. The apparatus also comprises a camera adapted to take an image of the laboratory sample container. The image comprises image data related to the laboratory sample container. The apparatus also comprises a control unit adapted to determine the properties of the laboratory sample container based on the image data related to the laboratory sample container.

16 Claims, 4 Drawing Sheets

(56) References Cited

U.S. PATENT DOCUMENTS

| | | | |
|---|---|---|---|
| 5,856,871 A | | 1/1999 | Cabib et al. |
| 10,591,421 B1* | | 3/2020 | Herrmann ................. B67C 3/24 |
| 2002/0006039 A1* | | 1/2002 | Ueda .................... F21V 7/0008 |
| | | | 362/225 |
| 2014/0374480 A1 | | 12/2014 | Pollack |
| 2018/0059006 A1* | | 3/2018 | Fritchie ................. G01N 21/27 |
| 2019/0120682 A1 | | 4/2019 | Ziegler et al. |
| 2021/0003509 A1* | | 1/2021 | Kawamura ............ G01N 21/85 |

FOREIGN PATENT DOCUMENTS

| | | | |
|---|---|---|---|
| JP | 2007-278989 A | 10/2007 | |
| JP | 2016-008927 A | 1/2016 | |
| JP | 2016-085221 A | 5/2016 | |
| JP | 2018-144839 A | 9/2018 | |
| JP | 2019-045470 A | 3/2019 | |
| JP | 2019-078665 A | 5/2019 | |
| WO | 2007/110372 A1 | 10/2007 | |
| WO | 2017/196193 A1 | 11/2017 | |
| WO | WO-2019164009 A1 * | 8/2019 | ........... B07C 5/3425 |

* cited by examiner

APPARATUS FOR DETERMINING PROPERTIES OF A LABORATORY SAMPLE CONTAINER, LABORATORY AUTOMATION SYSTEM AND METHOD FOR DETERMINING PROPERTIES OF A LABORATORY SAMPLE CONTAINER

CROSS-REFERENCE TO RELATED APPLICATIONS

This application claims priority to EP 19209352.4, filed Nov. 15, 2019, which is hereby incorporated by reference.

BACKGROUND

The present disclosure generally relates to an apparatus for determining properties of a laboratory sample container, a laboratory automation system and a method for determining properties of a laboratory sample container.

Laboratory sample containers often show a low contrast to backgrounds. This is a serious problem, since a sufficient contrast is essential for a reliable determination of properties of the laboratory sample containers based on image processing. This problem may be additionally aggravated if the laboratory sample containers are closed by, for example, dark caps.

Therefore, there is a need for an apparatus for determining properties of a laboratory sample container, a laboratory automation system and a method for determining properties of a laboratory sample container.

SUMMARY

According to the present disclosure, an apparatus for determining properties of a laboratory sample container is presented. The apparatus can comprise a light source for emitting light to illuminate the laboratory sample container and a number of curved reflecting and/or scattering units. A respective curved reflecting and/or scattering unit can comprise a curved shape and can be configured to reflect and/or scatter light of the light source to an outer surface of the laboratory sample container for illuminating the laboratory sample container. The apparatus can also comprise a camera configured to take an image of the laboratory sample container. The image can comprise image data related to the laboratory sample container. The apparatus can also comprise a control unit configured to determine the properties of the laboratory sample container based on the image data related to the laboratory sample container.

Accordingly, it is a feature of the embodiments of the present disclosure to provide an apparatus for determining properties of a laboratory sample container, a laboratory automation system and a method for determining properties of a laboratory sample container. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
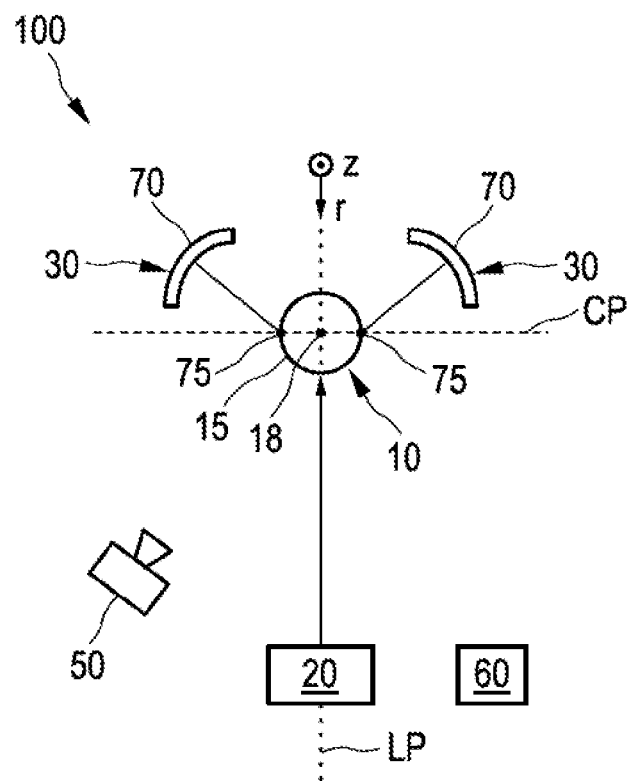
FIG. 1 illustrates schematically a cross-sectional view of the apparatus according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

An apparatus for determining properties of a laboratory sample container is presented. The apparatus can comprise the following a light source for emitting light to illuminate the laboratory sample container and a number of curved reflecting such as, for example, diffuse reflecting, and/or scattering units. A respective curved reflecting such as, for example, diffuse reflecting, and/or scattering unit can comprise a curved such as, for example, cross-sectional, shape or surface and can be configured to reflect such as, for example, diffuse reflect, and/or scatter such as, for example, by its inner surface or surface inside the curve, respectively, light of the light source to an outer surface of the laboratory sample container for illuminating the laboratory sample container. The apparatus can also comprise a camera configured to take an image such as, for example, of the outer surface, of the, for example, illuminated, laboratory sample container. The image can comprises image data related to the, for example, outer surface of the laboratory sample container and/or illuminated, laboratory sample container. The apparatus can also comprise a control unit configured to determine the properties of the laboratory sample container based on the image data related to the laboratory sample container.

With respect to the phrase "curved reflecting such as, for example, diffuse reflecting, and/or scattering unit(s)", the term "curved", can refer to the shape or surface of the reflecting, for example, diffuse reflecting, and/or scattering unit(s).

The properties of the laboratory sample container to be determined by the apparatus may be geometric properties, such as a length and/or a diameter, i.e. an internal diameter and/or an outer diameter, of the laboratory sample container. Alternatively, or in combination, the properties of the laboratory sample container to be determined by the apparatus may refer to a level, in particular, a liquid level, of a laboratory sample contained in the laboratory sample container. Alternatively, or in combination, the properties of the laboratory sample container to be determined by the apparatus may refer to the absence or presence of a cap for closing the laboratory sample container.

A respective curved reflecting and/or scattering unit may comprise a linear or straight, respectively, shape and/or may be elongated and/or may extend, in particular, linear or straight, respectively, in a direction substantially orthogonal or normal, respectively, to a, in particular, cross-sectional, plane, in particular, defined or spanned, respectively, by the curved, in particular, cross-sectional, shape, and/or substantially parallel to a longitudinal axis of the laboratory sample container. In other words, a respective curved reflecting and/or scattering unit may comprise a, in particular, the and/or same, curved, in particular, cross-sectional, shape in a, in particular, cross-sectional, plane being different from, in particular, below or above, a, in particular, the and/or cross-sectional, plane, in particular, defined or spanned, respectively, by the curved, in particular, cross-sectional, shape, and/or in a direction substantially parallel to a longitudinal axis of the laboratory sample container.

A respective curved reflecting and/or scattering unit, in particular, by its inner surface or surface inside the curve, respectively, may be facing to the light source and/or the camera and/or the laboratory sample container, in particular, its outer surface.

The camera configured to take an image of the laboratory sample container may be a digital camera.

According to an embodiment, the light source can be arranged or positioned, respectively, opposite to the number of curved reflecting and/or scattering units. The light source can be configured to illuminate the number of curved reflecting and/or scattering units, in particular, its/their inner surface/s or surface/s inside the curve/s, respectively. The apparatus can be configured to receive or carry the laboratory sample container between the light source, in particular, and the camera, and the number of curved reflecting and/or scattering units.

Additionally, or alternatively, the camera may be arranged or positioned, respectively, opposite to the number of curved reflecting and/or scattering units, in particular, wherein the apparatus may be configured to receive or carry the laboratory sample container between the camera and the number of curved reflecting and/or scattering units.

According to an embodiment, the curved shape can be a circular arc or can be in the form of a circular arc. In particular, an inscribed angle, in particular, a value of the inscribed angle, of the circular arc may be minimal about 45° (degrees) and/or maximal about 145°, in particular, about 90°.

According to an embodiment, a center, in particular, a center line segment, of the circular arc can be located on the outer surface of the laboratory sample container, when the laboratory sample container is received or carried by the apparatus.

In principle, the number of curved reflecting and/or scattering units may be one or more.

According to an embodiment, the apparatus, in particular, the number of curved reflecting and/or scattering units, can comprise two curved reflecting, in particular, diffuse reflecting, and/or scattering units, wherein each curved reflecting, in particular, diffuse reflecting, and/or scattering unit can comprise a curved, in particular, cross-sectional, shape or surface and can be configured to reflect, in particular, diffuse reflect, and/or scatter, in particular, by its inner surface or surface inside the curve, respectively, light of the light source to an outer surface of the laboratory sample container for illuminating the laboratory sample container. Thus, the light of the light source may be reflected, in particular, diffuse reflected, and/or scattered to different, in particular, oppositely arranged, points or lines or areas of the outer surface of the laboratory sample container resulting in a better contrast to a background. In particular, the curved reflecting and/or scattering units, in particular, by their inner surfaces or surfaces inside the curves, respectively, may be facing to each other.

According to an embodiment, the centers of the circular arcs of the two reflecting and/or scattering units can be opposite to each other. In particular, each curved shape, in particular, of each of the two curved reflecting and/or scattering units, may be a circular arc or is in the form of a circular arc.

According to an embodiment, the centers, in particular, center line segments or of the circular arcs, can be in a center-plane substantially parallel to, in particular, defined or spanned, respectively, by, a longitudinal axis of the laboratory sample container and substantially orthogonal to a plane comprising the light source and the longitudinal axis of the laboratory sample container or substantially orthogonal or normal, respectively, to a direction from the longitudinal axis to the light source, when the laboratory sample container is received or carried by the apparatus. In particular, the camera may be arranged or positioned, respectively, on a same side of the center-plane as the light source.

According to an embodiment, the apparatus can further comprise a number of linear or straight, respectively, reflecting, in particular, retroreflecting, units, wherein a respective linear reflecting, in particular, retroreflecting, unit comprises a linear or straight, respectively, in particular, cross-sectional, shape or surface and can be configured to reflect, in particular, by its surface, light of the light source to a cap closing the laboratory sample container, in particular, for creating a contrast to the cap, and/or to an, in particular, the, outer surface of the laboratory sample container, in particular, for illuminating the laboratory sample container. The number of linear reflecting, in particular, retroreflecting, units, in particular, by its/their surface/s, can be arranged substantially orthogonally to a, in particular, the, plane comprising the light source and a, in particular, the, longitudinal axis of the laboratory sample container or can be substantially orthogonal or normal, respectively, to a, in particular, the, direction from the longitudinal axis to the light source, when the laboratory sample container is received or carried by the apparatus.

Thus, the visibility and/or contrast of the cap, in particular, if it is in the form of a dark, multi-colored or bright cap, may be generated or improved.

With respect to the phrase "linear reflecting, in particular, retroreflecting, unit(s)", the term "linear", according to the present invention, can refer to the shape or surface of the reflecting, in particular, retroreflecting, unit(s).

The number of linear reflecting units may be arranged between the two curved reflecting and/or scattering units.

In principle, the number of linear reflecting units may be one or more.

In particular, the apparatus can further comprise one, i.e. only one, linear reflecting, in particular, retroreflecting, unit, wherein the linear reflecting, in particular, retroreflecting, unit can comprise a linear or straight, respectively, in particular, cross-sectional, shape or surface and can be configured to reflect, in particular, by its surface, light of the light source to a, in particular, the, cap closing the laboratory sample container, in particular, for creating a contrast to the cap, and/or to an, in particular, the, outer surface of the laboratory sample container, in particular, for illuminating the laboratory sample container. The linear reflecting, in particular, retroreflecting, unit, in particular, by its surface, can be arranged substantially orthogonally to a, in particular, the, plane comprising the light source and a, in particular, the, longitudinal axis of the laboratory sample container or can be substantially orthogonal or normal, respectively, to a, in particular, the, direction from the longitudinal axis to the light source, when the laboratory sample container is received or carried by the apparatus.

The linear reflecting unit may be arranged between the two curved reflecting and/or scattering units, in particular, between two ends of the two curved reflecting and/or scattering units.

A respective linear reflecting unit may comprise a linear or straight, respectively, shape and/or may be elongated and/or may extend, in particular, linear or straight, respectively, in a, in particular, the, direction substantially orthogonal or normal, respectively, to a, in particular, the and/or cross-sectional, plane, in particular, defined or spanned, respectively, by the linear, in particular, cross-sectional, shape, and/or substantially parallel to the longitudinal axis of the laboratory sample container. In other words, a respective linear reflecting unit may comprise a, in particular, the and/or same, linear, in particular, cross-sectional, shape in a, in particular, cross-sectional, plane being different from, in particular, below or above, a, in particular, the and/or cross-sectional, plane, in particular, defined or spanned, respectively, by the linear, in particular, cross-sectional, shape, and/or in the direction parallel to the longitudinal axis of the laboratory sample container.

A respective linear reflecting unit, in particular, by its surface, may be facing to the light source and/or the camera and/or the laboratory sample container, in particular, its outer surface, and/or the cap.

The light source may be arranged or positioned, respectively, opposite to the number of linear reflecting units, in particular, wherein the light source may be configured to illuminate the number of linear reflecting units, in particular, its/their surface/s, and/or wherein the apparatus may be configured to receive or carry the laboratory sample container between the light source and the number of linear reflecting units. Additionally, or alternatively, the camera may be arranged or positioned, respectively, opposite to the number of linear reflecting units, in particular, wherein the apparatus may be configured to receive or carry the laboratory sample container between the camera and the number of linear reflecting units.

The number of linear reflecting units may be arranged or positioned, respectively, on an opposite side of the center-plane as the light source and/or the camera.

The apparatus may further comprise a background, in particular, a black background. The background may be in the form of a one-piece background or a multipart background. The background may be configured to carry the number of curved reflecting and/or scattering units and/or the number of linear reflecting units. Alternatively, or in combination, the background may be configured to keep the shape of the number of curved reflecting and/or scattering units and/or of the number of linear reflecting units. In particular, the background, in particular, a number of sections or segments, respectively, of the background, may comprise a curved and/or linear, in particular, cross-sectional, shape. In other words, the background may have the shape, surface, or form of a cut out of a cylinder or a cylinder inner or inside lateral area surface. Additionally, or alternatively, the background may comprise a linear or straight, respectively, shape and/or may be elongated and/or may extend, in particular, linear or straight, respectively, in a, in particular, the, direction substantially orthogonal or normal, respectively, to a, in particular, the and/or cross-sectional, plane, in particular, defined or spanned, respectively, by the curved and/or linear, in particular, cross-sectional, shape, and/or substantially parallel to the longitudinal axis of the laboratory sample container. In other words, the background may comprise a, in particular, the and/or same, curved and/or linear, in particular, cross-sectional, shape in a, in particular, cross-sectional, plane being different from, in particular, below or above, a, in particular, the and/or cross-sectional, plane, in particular, defined or spanned, respectively, by the curved and/or linear, in particular, cross-sectional, shape, and/or in the direction substantially parallel to the longitudinal axis of the laboratory sample container. Additionally, or alternatively, the background, in particular, by its surface, may be facing to the light source and/or the camera and/or the laboratory sample container, in particular, its outer surface, and/or the cap. Additionally, or alternatively, the light source and/or the camera may be arranged or positioned, respectively, opposite to the background, in particular, wherein the apparatus may be configured to receive or carry the laboratory sample container and/or the number of curved reflecting and/or scattering units and/or the number of linear reflecting units may be arranged or positioned, respectively, between the light source and/or the camera and the background. Additionally, or alternatively, the background may be arranged or positioned, respectively, on an opposite side of the center-plane as the light source and/or the camera.

According to an embodiment, the number of curved reflecting and/or scattering units can be in the form of a respective number of white stripes and/or the number of linear reflecting units can be in the form of a respective number of retroreflectors.

Alternatively, or in combination, the number of curved reflecting and/or scattering units can be in the form of a respective number of white stripes and/or the number of linear reflecting units can be in the form of a respective number of white stripes. In other words, a respective curved reflecting and/or scattering unit may be in the form of a white stripe and/or a respective linear reflecting unit may be in the form of a white stripe. The white stripes/stripe may have a white coating or white outer layer. Alternatively or in combination, the white stripes/stripe may be made of a white material. In particular, the white stripes/stripe may be in the form of white sheets of paper/a white sheet of paper. The white stripes/stripe may be also termed as white bands/band or white strips/strip according to the present invention.

Alternatively, or in combination, the number of curved reflecting and/or scattering units may be in the form of a respective number of luminous or light stripes and/or the number of linear reflecting units may be in the form of a respective number of luminous or light stripes. In other words, a respective curved reflecting and/or scattering unit may be in the form of a luminous or light stripe and/or a respective linear reflecting unit may be in the form of a luminous or light stripe. For example, the luminous or light stripe may be a luminous or light stripe containing elemental silver or a silver salt, in particular, in the form of particles. The luminous or light stripe may be also termed as luminous or light strip or luminous or light band according to the present invention.

Alternatively, or in combination, the number of curved reflecting and/or scattering units may be in the form of a respective number of mirrors, in particular, parabolic reflectors, and/or the number of linear reflecting units may be in the form of a respective number of mirrors. In other words, a respective curved reflecting and/or scattering unit may be in the form of a mirror, in particular, parabolic reflector, and/or a respective linear reflecting unit may be in the form of a mirror.

In particular, the number of curved reflecting and/or scattering units can be in the form of a respective number of white stripes and the number of linear reflecting units can be in the form of a respective number of luminous or light stripes, in particular, luminous or light stripes containing elemental silver or a silver salt. In other words, a respective curved reflecting and/or scattering unit may be in the form of a white stripe and a respective linear reflecting unit may be in the form of a luminous or light stripe, in particular, a luminous or light stripe containing elemental silver or a silver salt.

According to an embodiment, the light source can be a white light source, i.e., a light source for emitting white light, i.e., light having a wavelength from about 380 nm to about 780 nm.

Alternatively, the light source may be a red light source, i.e., a light source for emitting red light, i.e., light having a wavelength from about 640 nm to about 780 nm.

Alternatively, the light source may be an orange light source, i.e., a light source for emitting orange light, i.e., light having a wavelength from about 600 nm to about 640 nm.

Alternatively, the light source may be a yellow light source, i.e., a light source for emitting yellow light, i.e., light having a wavelength from about 570 nm to about 600 nm.

Alternatively, the light source may be a green light source, i.e., a light source for emitting green light, i.e., light having a wavelength from about 490 nm to about 570 nm.

Alternatively, the light source may be a blue light source, i.e., a light source for emitting blue light, i.e., light having a wavelength from about 430 nm to about 490 nm.

Alternatively, the light source may be a violet light source, i.e., a light source for emitting violet light, i.e., light having a wavelength from about 380 nm to about 430 nm.

According to an embodiment, the apparatus can further comprises a driving unit configured to move the laboratory sample container relative to the number of curved reflecting and/or scattering units and/or the number of linear reflecting units and/or the camera and/or the light source, in particular, in a, in particular, cross-sectional, plane, in particular, defined or spanned, respectively, by the curved and/or linear, in particular, cross-sectional, shape, or orthogonal or normal, respectively, to a, in particular, the, longitudinal axis of the laboratory sample container and/or in a direction substantially parallel to the longitudinal axis of the laboratory sample container. The control unit can be configured to determine the properties of the laboratory sample container based on the image data related to the laboratory sample container for different relative, in particular, moving, positions, in particular, caused by the moving, between the laboratory sample container and the number of curved reflecting and/or scattering units and/or the number of linear reflecting units and/or the camera and/or the light source.

In particular, the driving unit may be arranged in a plane being different from, in particular, below or above, a, in particular, the and/or cross-sectional, plane, in particular, defined or spanned, respectively, by the number of curved reflecting and/or scattering units and/or the number of linear reflecting units and/or the camera and/or the light source, and/or, in particular, in the direction substantially parallel to the longitudinal axis of the laboratory sample container, below or above the number of curved reflecting and/or scattering units and/or the number of linear reflecting units and/or the camera and/or the light source.

The laboratory automation system can be, in particular, configured to handle and/or process laboratory samples contained in laboratory sample containers.

The laboratory automation system can comprise the apparatus, i.e., the apparatus for determining properties of a laboratory sample container as described in the previous description, and a number of laboratory stations functionally coupled to the apparatus.

The number of laboratory stations may range from 1 to 100, for example.

At least one of the number of laboratory stations may be configured to analyze a laboratory sample contained in the laboratory sample container.

Further, the number of laboratory stations may be one or more pre-analytical stations and/or one or more analytical stations and/or one or more post-analytical stations.

Pre-analytical stations may be configured to perform any kind of pre-processing of laboratory samples and/or laboratory sample containers and/or laboratory sample container carriers.

Analytical stations may be configured to use a laboratory sample or a part of a laboratory sample and a reagent to generate a measuring signal, the measuring signal indicating if and in which concentration, if any, an analyte exists.

Post-analytical stations may be configured to perform any kind of post-processing of laboratory samples and/or laboratory sample containers and/or laboratory sample container carriers.

The pre-analytical and/or analytical and/or post-analytical stations may comprise at least one of a decapping station, a recapping station, an aliquot station, a centrifugation station, an archiving station, a pipetting station, a sorting station, a tube type identification station, a laboratory sample quality determining station, an add-on buffer station, a liquid level detection station, and a sealing/desealing station.

Further, the laboratory automation system may comprise a laboratory pipetting station, wherein the laboratory pipetting station can be controlled by a process control unit or by the control unit of the apparatus.

The laboratory pipetting station may be configured to operate in response to a level, in particular, liquid level, of a laboratory sample contained in the laboratory sample container. The laboratory pipetting station may perform an aspiration of the laboratory sample, in particular, at a specific vertical aspiration position depending on the level, in particular, liquid level, of the laboratory sample.

With respect to further features of the laboratory automation system, in particular, the described apparatus, reference is made in its entirety to the previous description.

The method for determining properties of a, in particular, the, laboratory sample container can comprises the following steps: emitting light from a, in particular, the, light source to illuminate the laboratory sample container and reflecting, in particular, diffuse reflecting, and/or scattering the light of the light source to an, in particular, the, outer surface of the laboratory sample container from a, in particular, the, number of curved reflecting, in particular, diffuse reflecting, and/or scattering units. A, in particular, the, respective curved reflecting, in particular, diffuse reflecting, and/or scattering unit can comprise a, in particular, the, curved shape or surface and can be configured to reflect, in particular, diffuse reflect, and/or scatter light of the light source to an, in particular, the, outer surface of the laboratory sample container for illuminating the laboratory sample container. The method can also comprise taking an, in particular, the, image of the illuminated laboratory sample container. The image can comprise, in particular, the, image data related to the illuminated laboratory sample container. The method can also comprise determining the properties of the laboratory sample container based on the image data related to the illuminated laboratory sample container.

The laboratory sample container may be made of a transparent material such as glass or a transparent polymer, e.g., polycarbonate or acrylic glass.

With respect to further features of the method, in particular, the light source and the number of curved reflecting and/or scattering units, reference can be made in its entirety to the previous description.

The present disclosure can be, in particular, based on the following surprising/advantageous findings.

The apparatus can facilitate a better illumination of a laboratory sample container and, in particular, a better contrast of a laboratory sample container to a background by a number of curved reflecting and/or scattering units, in particular, by two curved reflecting and/or scattering units. In particular, the at least one curved shape can facilitate, in particular, the two curved shapes can facilitate, focusing, in particular, focus/es, light of the light source nearby or on the outer surface of the laboratory sample container for illuminating the laboratory sample container, in particular, in at least one point or line or area, in particular, in two points or lines or areas, in particular, imaged or seen, respectively, by the camera.

This does even more apply if a respective curved reflecting and/or scattering unit has the shape of a circular arc. A center, in particular, a center line segment, of the circular arc can be located on an outer surface of the laboratory sample container, when the laboratory sample container is received or carried by the apparatus. Thus, in case of two curved reflecting and/or scattering units, light emitted by a light source may be reflected and/or scattered to different, in particular, oppositely arranged, points or lines or areas of the outer surface of the laboratory sample container resulting, in particular, in better illumination of these points and lines and areas, respectively of the laboratory sample container, and thus in a better contrast of the laboratory sample container to a background.

The contrast of the laboratory sample container to a background may be additionally enhanced if the apparatus can further comprise a number of linear reflecting units. Thus, in particular, a better visibility and/or contrast of a cap, in particular, a dark, multi-colored or bright cap, if any, of the laboratory sample container may be accomplished.

The overall better contrast of the laboratory sample container to a background can allow a more reliable and thus optimized determination of the properties of the laboratory sample container based on image data related to the laboratory sample container.

Referring initially to FIG. 1, FIG. 1 schematically depicts, in particular, a cross-sectional view of, a first embodiment of an apparatus 100 for determining properties of a laboratory sample container 10.

The apparatus 100 can comprise a light source 20 for emitting light to illuminate the laboratory sample container 10.

The apparatus 100 can further comprise two curved reflecting, in particular, diffuse reflecting, and/or scattering units 30, wherein each curved reflecting, in particular, diffuse reflecting, and/or scattering unit 30 can have a curved, in particular, cross-sectional, shape or surface and can be configured to reflect, in particular, diffuse reflect, and/or scatter, in particular, by its inner surface or surface inside the curve, respectively, light of the light source 20 to an outer surface 15 of the laboratory sample container 10 for illuminating the laboratory sample container 10.

Each curved reflecting and/or scattering unit 30 may be in the form of a white stripe 35, e.g., a white sheet of paper. See FIG. 5.

The apparatus can further comprise a camera 50. The camera 50 can be configured to make or to take, respectively, an image, in particular, of the outer surface, of the, in particular, illuminated, laboratory sample container 10. The image taken by the camera 50 can comprise image data related to the, in particular, outer surface of the and/or illuminated, laboratory sample container 10.

The apparatus can further comprise a control unit 60. The control unit 60 can be configured to determine the properties of the laboratory sample container 10 based on the image data taken by the camera 50 and related to the laboratory sample container 10.

The apparatus 100 can be further configured to receive the laboratory sample container 10 between the light source 20, in particular, and the camera 50, and the two curved reflecting and/or scattering units 30.

The light source 20, e.g., a white light source, can be arranged opposite to the two curved reflecting and/or scattering units 30 and can be configured to illuminate the two curved reflecting and/or scattering units 30, in particular, their inner surfaces or surfaces inside the curves, respectively.

The camera 50 can be arranged opposite to the two curved reflecting and/or scattering units 30.

The curved shape of each reflecting and/or scattering unit 30 can be a circular arc 70, wherein a center 75, in particular, a center line segment, of each circular arc 70 can be located on the outer surface 15 of the laboratory sample container 10, when the laboratory sample container 10 is received by the apparatus 100.

Further, the centers 75, in particular, the center line segments, of the circular arcs 70 can be opposite to each other and/or can be in a center-plane CP, wherein the center-plane CP can be substantially parallel to, in particular, defined or spanned, respectively, by, a longitudinal axis 18, in particular, substantially parallel to or in, respectively, a direction z, of the laboratory sample container 10 and substantially orthogonal to a plane LP, wherein the plane LP can comprise the light source 20 and the longitudinal axis 18 of the laboratory sample container 10, or substantially orthogonal or normal, respectively, to a direction r, in particular, substantially orthogonal to the direction z, from the longitudinal axis 18 to the light source 20, when the laboratory sample container 10 is received by the apparatus 100.

Thus, light emitted by the light source 20 may be reflected to oppositely arranged points, lines, or areas of the outer surface 15 of the laboratory sample container 10, thereby bettering illumination of the laboratory sample container 10, and resulting in a better contrast of the laboratory sample container 10 against a background.

The properties of the laboratory sample container 10 to be determined by the apparatus 100 may relate, for example, to geometric properties, such as length and/or diameter, of the laboratory sample container 10 or to a level, in particular, liquid level, of a laboratory sample contained in the laboratory sample container 10 or to a cap, if any, of the laboratory sample container 10.

Figure 2:
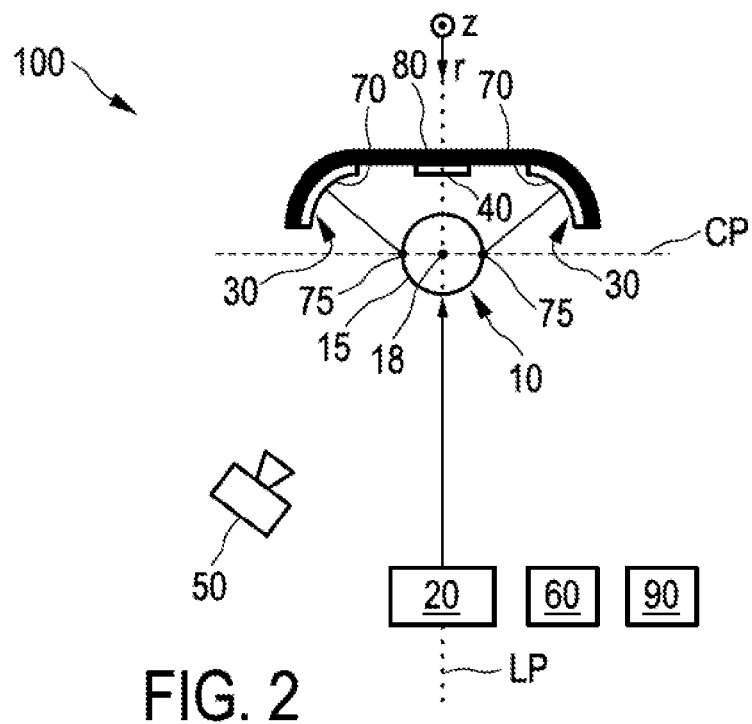
FIG. 2 illustrates schematically a cross-sectional view of the apparatus according to another embodiment of the present disclosure.

FIG. 2 schematically depicts, in particular, a cross-sectional view of, a second embodiment of an apparatus 100 for determining properties of a laboratory sample container 10.

The apparatus 100 can comprise a light source 20, two curved reflecting, in particular, diffuse reflecting, and/or scattering units 30, a camera 50, and a control unit 60 as detailed in the description referring to FIG. 1.

In addition, the apparatus 100 can comprise a linear reflecting, in particular, retroreflecting, unit 40. The linear reflecting, in particular, retroreflecting, unit 40 can have a linear, in particular, cross-sectional, shape or surface and can be configured to reflect, in particular, by its surface, light of the light source 20 to a cap closing the laboratory sample container, in particular, for creating a contrast to the cap, and/or to an outer surface 15 of the laboratory sample container 10, in particular, for illuminating the laboratory sample container 10.

The linear reflecting unit 40, in particular, by its surface, can be arranged substantially orthogonally to a plane LP comprising the light source 20 and a longitudinal axis 18, in particular, substantially parallel to or in, respectively, a direction z, of the laboratory sample container 10 or substantially orthogonally or normally, respectively, to a direction r, in particular, substantially orthogonal to the direction z, from the longitudinal axis 18 to the light source 20, when the laboratory sample container 10 is received by the apparatus 100. In particular, the linear reflecting unit 40 may be arranged between the two curved reflecting and/or scattering units 30, in particular, between two ends of the two curved reflecting and/or scattering units 30.

While each of the two curved reflecting and/or scattering units 30 may be in the form of a white stripe, e.g., a white sheet of paper, the linear reflecting unit 40 may be in the form of a retroreflector.

The apparatus 100 can further comprise a driving unit 90. The driving unit 90 can be configured to move the laboratory sample container 10 relative to the two curved reflecting and/or scattering units 30 and/or the linear reflecting unit 40 and/or the camera 50 and/or the light source 20, in particular, in a, in particular, cross-sectional, plane, in particular, defined or spanned, respectively, by the curved and/or linear, in particular, cross-sectional, shape, or substantially orthogonal or normal, respectively, to the longitudinal axis 18 of the laboratory sample container 10 and/or substantially parallel or in, respectively, the direction z substantially parallel to or in, respectively, the longitudinal axis 18 of the laboratory sample container 10.

The control unit 60 can be configured to determine the properties of the laboratory sample container 10 based on the image data related to the laboratory sample container 10 for different relative, in particular, moving, positions, in particular, caused by the moving, between the laboratory sample container 10 and the two curved reflecting and/or scattering units 30 and/or the linear reflecting unit 40 and/or the camera 50 and/or the light source 20.

Further, a black background 80 can be assigned to the apparatus 100. Alternatively, the apparatus 100 can comprise a black background 80. The background 80 can be in the form of a one-piece background. Further, the background 80 may be configured to carry the two curved reflecting and/or scattering units 30 and the linear reflecting unit 40. In addition or alternatively, the background 80 may be configured to keep the shape of the two curved reflecting and/or scattering units 30 and the linear reflecting unit 40.

Due to the linear reflecting unit 40, (even more) light emitted by the light source 20 may be reflected to the outer surface 15 of the laboratory sample container 10 and/or to a cap of the laboratory sample container 10. Thus, the contrast of the laboratory sample container 10 to the black background 80 may be additionally enhanced and/or the visibility and/or contrast of a cap, in particular, a dark, multi-colored or bright cap, if any, of the laboratory sample 10 may be created or improved.

With respect to further features of the apparatus 100, reference is made in its entirety to the description referring to FIG. 1.

Figure 3:
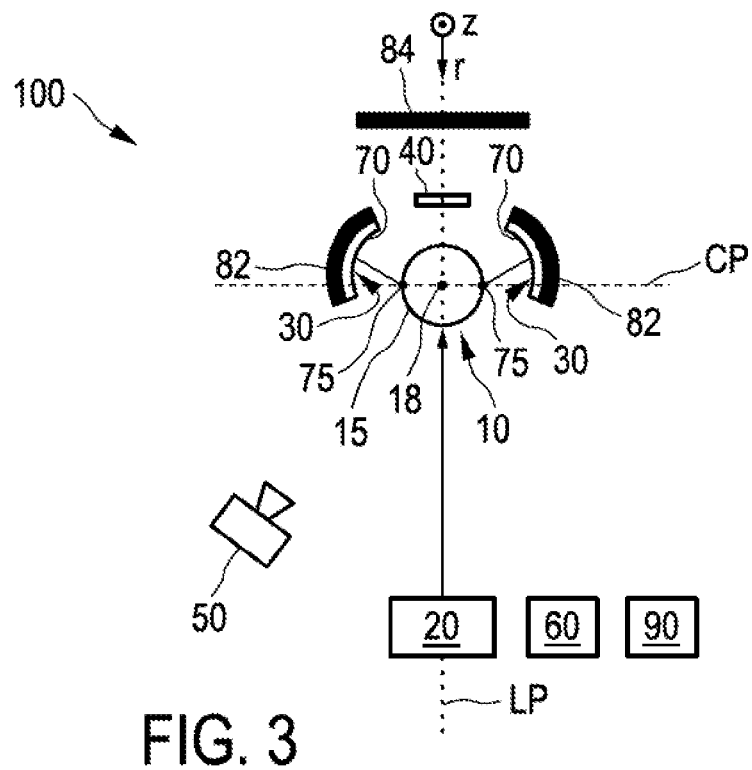
FIG. 3 illustrates schematically a cross-sectional view of the inventive apparatus according to yet another embodiment of the present disclosure.

FIG. 3 schematically depicts, in particular, a cross-sectional view of, a third embodiment of an apparatus 100 for determining properties of a laboratory sample container 10.

The apparatus 100 can comprise a light source 20, two curved reflecting, in particular, diffuse reflecting, and/or scattering units 30, a camera 50, and a control unit 60 as detailed in the description referring to FIG. 1.

The apparatus 100 can further comprise a linear reflecting, in particular, retroreflecting, unit 40 and a driving unit 90 as detailed in the description referring to FIG. 2.

In addition, a multipart black background can be assigned to the apparatus 100. Alternatively, the apparatus 100 can comprise a multipart black background.

The multipart black background can be in the, in particular, cross-sectional, form of two curved black backgrounds 82 and of a linear black background 84.

Each curved black background 82 can comprise a curved, in particular, cross-sectional, shape, in particular, a circular arc. The linear black background 84 can comprise a linear, in particular, cross-sectional, shape.

The two curved black backgrounds 82 may be configured to carry the curved reflecting and/or scattering units 30 and/or to keep the shape of the curved reflecting and/or scattering units 30.

The linear black background 84, in particular, by its surface, can be arranged substantially orthogonally to a plane LP comprising the light source 20 and a longitudinal axis 18, in particular, substantially parallel to or in, respectively, a direction z, of the laboratory sample container 10 or substantially orthogonally or normally, respectively, to a direction r, in particular, substantially orthogonal to the direction z, from the longitudinal axis 18 to the light source 20, when the laboratory sample container 10 is received by the apparatus 100. The linear black background 84 can be arranged in a distance, in particular, substantially parallel to or in, respectively, the direction r, to the laboratory sample container 10 which can be longer/greater than a distance, in particular, substantially parallel to or in, respectively, the direction r, at which the linear reflecting unit 40 can be arranged to the laboratory sample container 10, when the laboratory sample container 10 is received by the apparatus 100.

Due to the linear black background 84, visibility of a cap, in particular, a dark, multi-colored or bright cap, if any, of the laboratory sample container 10 may be additionally improved.

With respect to further features of the apparatus 100, reference can be made in its entirety to the description referring to FIGS. 1 and 2.

Figure 4:
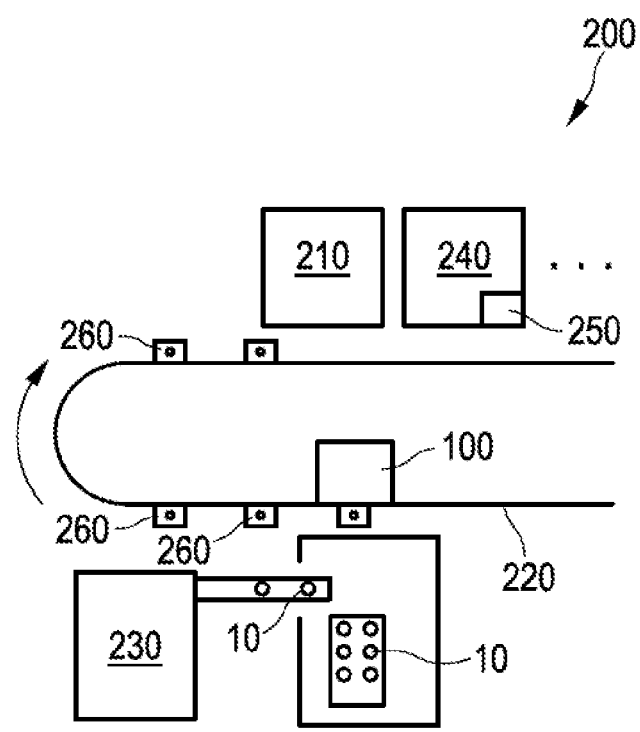
FIG. 4 illustrates schematically a top view of the laboratory automation system according to an embodiment of the present disclosure.

FIG. 4 schematically depicts, in particular, a top view of, a laboratory automation system 200.

The laboratory automation system 200 can comprise the apparatus 100 as depicted in FIG. 1, 2 or 3 and a number of laboratory stations 210, 230 and 240 each of them functionally coupled to the apparatus 100, for example by a conventional data or field bus.

In detail, the laboratory automation system 200 may comprise a decapping station 210, a centrifugation station 230 and an aliquot station 240 including a pipetting station 250.

The system 200 can further include a laboratory sample container transport unit configured to transport laboratory sample containers 10 between the apparatus 100 and the number of laboratory stations 210, 230 and 240. The laboratory sample container transport unit can include a number of laboratory sample container carriers 260 and a conveyor 220, wherein the laboratory sample container carriers 260 can be attached to the conveyor 220.

Figure 5:
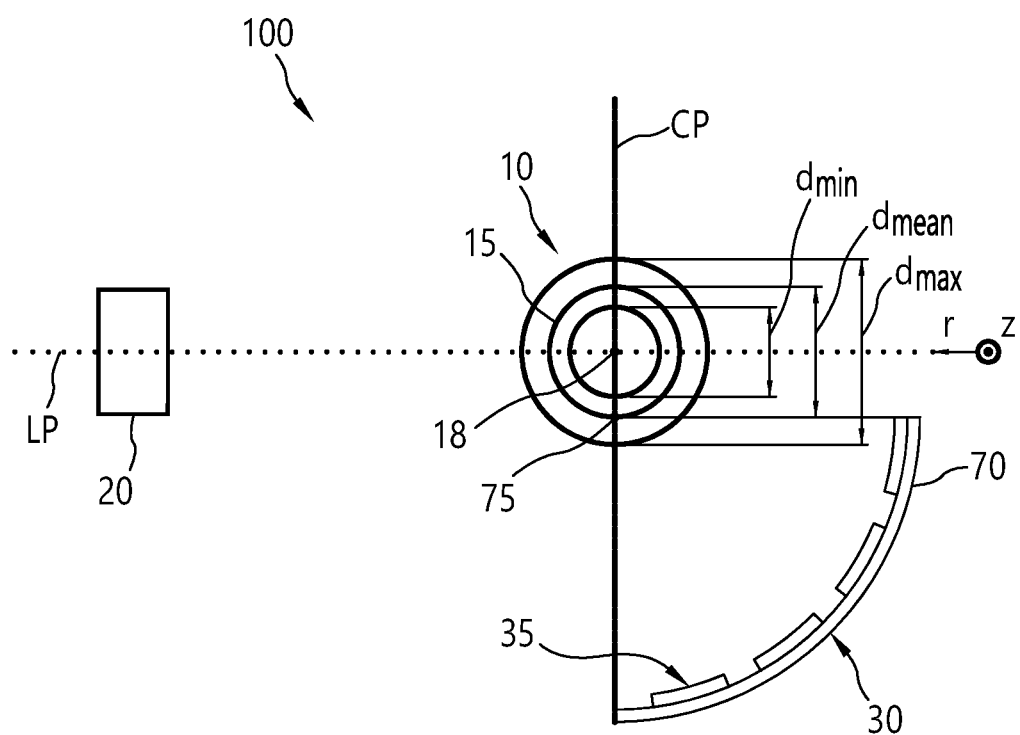
FIG. 5 illustrates schematically a cross-sectional view of the apparatus according to still yet another embodiment of the present disclosure.

FIG. 5 schematically depicts, in particular, a cross-sectional view of, a further embodiment of an apparatus 100 for determining properties of a laboratory sample container 10.

The apparatus 100 can comprise a light source 20 for emitting light to illuminate the laboratory sample container 10.

The apparatus 100 can further comprise two curved reflecting, in particular, diffuse reflecting, and/or scattering units, wherein each curved reflecting, in particular, diffuse reflecting, and/or scattering unit can have a curved, in particular, cross-sectional, shape or surface and can be configured to reflect, in particular, diffuse reflect, and/or scatter, in particular, by its inner surface or surface inside the curve, respectively, light of the light source 20 to an outer surface 15 of the laboratory sample container 10 for illuminating the laboratory sample container 10. Each curved reflecting and/or scattering unit 30 may be in the form of a white stripe, e.g., a white sheet of paper. In FIG. 5, only one curved reflecting, in particular, diffuse reflecting, and/or scattering unit 30 of the two curved, in particular, diffuse reflecting, and/or scattering units is depicted.

The apparatus 100 can be further configured to receive the laboratory sample container 10 between the light source 20, in particular, and a camera (not depicted), and the two curved reflecting and/or scattering units.

The light source 20, e.g., a white light source, can be arranged opposite to the two curved reflecting and/or scattering units and can be configured to illuminate the two curved reflecting and/or scattering units, in particular, their inner surfaces or surfaces inside the curves, respectively.

The curved shape of each reflecting and/or scattering unit can be a circular arc 70, wherein a center 75, in particular, a center line segment, of each circular arc 70 can be located on the outer surface 15 of the laboratory sample container 10, when the laboratory sample container 10 is received by the apparatus 100.

Further, the centers, in particular, the center line segments, of the circular arcs can be opposite to each other and/or can be in a center-plane CP, wherein the center-plane CP can be substantially parallel to, in particular, defined or spanned, respectively, by, a longitudinal axis 18, in particular, substantially parallel to or in, respectively, a direction z, of the laboratory sample container 10 and substantially orthogonal to a plane LP, wherein the plane LP can comprise the light source 20 and the longitudinal axis 18 of the laboratory sample container 10, or substantially orthogonal or normal, respectively, to a direction r, in particular, substantially orthogonal to the direction z, from the longitudinal axis 18 to the light source 20, when the laboratory sample container 10 is received by the apparatus 100.

Thus, light emitted by the light source 20 may be reflected to oppositely arranged points, lines, or areas of the outer surface 15 of the laboratory sample container 10, thereby bettering illumination of the laboratory sample container 10, and resulting in an increased contrast of the laboratory sample container 10 against a background.

The laboratory sample container 10 may have, for example, a maximum diameter $d_{max}$ of about 16 mm and a minimum diameter $d_{min}$ of about 11 mm.

In particular, the light source 20 and/or the two curved reflecting and/or scattering units may be located or positioned such that the centers, in particular, the center line segments, of the circular arcs can be opposite to each other and/or can be in the center-plane CP, wherein the centers, in particular, the center line segments, can have a mutual distance to each other which can correspond to a mean diameter $d_{mean}$ of the maximum diameter $d_{max}$ and minimum diameter $d_{min}$ of the laboratory sample container 10. For example, the average value may be approximately 13.5 mm.

The properties of the laboratory sample container 10 to be determined by the apparatus 100 may relate, for example, to geometric properties, such as length and/or diameter, of the laboratory sample container 10 or to a level, in particular, liquid level, of a laboratory sample contained in the laboratory sample container 10 or to a cap, if any, of the laboratory sample container 10.

With respect to further features and advantages of the apparatus 100, reference is made in its entirety to the description referring to FIG. 1.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

For the purposes of describing and defining the present disclosure, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. An apparatus for determining properties of a laboratory sample container, the apparatus comprising:
   a laboratory sample container having an outer surface;
   a light source emitting light and illuminating the laboratory sample container;
   a curved reflecting and/or scattering unit, the curved reflecting and/or scattering unit comprising a curved shape and reflecting and/or scattering light of the light source to the outer surface of the laboratory sample container and illuminating the laboratory sample container;
   wherein the curved shape of the reflecting and/or scattering unit is a circular arc, and
   wherein a center of the circular arc is located on the outer surface of the laboratory sample container,
   a camera configured to take an image of the laboratory sample container, wherein the image comprises image data related to the laboratory sample container; and a control unit determining at least one property of the laboratory sample container based on the image data related to the laboratory sample container the at least one property being selected from the group consisting of: a geometric property of the laboratory sample container; a length, a diameter, an internal diameter, and/or an outer diameter of the laboratory sample container and/or the absence or presence of a cap closing the laboratory sample container.

2. The apparatus according to claim 1, wherein the light source is arranged opposite to the curved reflecting and/or scattering unit, wherein the light source illuminates the curved reflecting and/or scattering unit, and wherein the apparatus receives the laboratory sample container between the light source and the curved reflecting and/or scattering unit.

3. The apparatus according to claim 1, wherein the apparatus comprises two curved reflecting and/or scattering units, each comprising a curved shape and each reflecting and/or scattering light of the light source to the outer surface of the laboratory sample container for illuminating the laboratory sample container, and wherein the curved shape of each of the reflecting and/or scattering units is a circular arc having an arc center, and each of the arc centers is located on the outer surface of the laboratory sample container.

4. The apparatus according to claim 3, wherein the control unit determines a geometric property of the laboratory sample container selected from the group consisting of a length, a diameter, an internal diameter, and an outer diameter of the laboratory sample container.

5. The apparatus according to claim 3, wherein the control unit determines the absence or presence of a cap closing the laboratory sample container.

6. The apparatus according to claim 3, wherein the arc centers are on opposite sides of the laboratory sample container.

7. The apparatus according to claim 3, wherein the arc centers are in a center-plane (CP) parallel to a longitudinal axis of the laboratory sample container and orthogonal to a plane (LP) comprising the light source and the longitudinal axis of the laboratory sample container.

8. An apparatus for determining properties of a laboratory sample container, the apparatus comprising:
a laboratory sample container having an outer surface;
a light source emitting light and illuminating the laboratory sample container;
two curved reflecting and/or scattering units, each curved reflecting and/or scattering unit comprising a curved shape, wherein each curved shape is a circular arc and reflecting and/or scattering light of the light source to the outer surface of the laboratory sample container and illuminating the laboratory sample container;
a camera configured to take an image of the laboratory sample container, wherein the image comprises image data related to the laboratory sample container; and
a control unit determining at least one property of the laboratory sample container based on the image data related to the laboratory sample container,
wherein each curved reflecting and/or scattering unit has a curved shape and each is reflecting and/or scattering light of the light source to the outer surface of the laboratory sample container for illuminating the laboratory sample container, and
wherein the centers of the circular arcs of the two reflecting and/or scattering units are on opposite sides of the laboratory sample container.

9. The apparatus according to claim 8, wherein the arc centers are in a center-plane (CP) parallel to a longitudinal axis of the laboratory sample container and orthogonal to a plane (LP) comprising the light source and the longitudinal axis of the laboratory sample container.

10. The apparatus according to claim 8, and further comprising:
a number of linear reflecting units, wherein a respective linear reflecting unit comprises a linear shape and reflects light of the light source to a cap closing the laboratory sample container, wherein the number of linear reflecting units is arranged orthogonally to a plane (LP) comprising the light source and a longitudinal axis of the laboratory sample container.

11. The apparatus according to claim 8, wherein the number of curved reflecting and/or scattering units is in the form of a number of white stripes and/or the number of linear reflecting units is in the form of a number of retroreflectors.

12. The apparatus according to claim 8, wherein the light source is a white light source.

13. The apparatus according to claim 8, further comprising:
a driving unit moving the laboratory sample container relative to the number of curved reflecting and/or scattering units and/or the number of linear reflecting units and/or the camera and/or the light source, wherein the control unit determines the properties of the laboratory sample container based on the image data related to the laboratory sample container for different relative positions between the laboratory sample container and the number of curved reflecting and/or scattering units and/or a number of linear reflecting units and/or the camera and/or the light source.

14. A laboratory automation system, the laboratory automation system comprising:
the apparatus according to claim 8; and
a number of laboratory stations functionally coupled to the apparatus.

15. The apparatus according to claim 8, wherein the control unit determines a geometric property of the laboratory sample container selected from the group consisting of a length, a diameter, an internal diameter, and an outer diameter of the laboratory sample container.

16. The apparatus according to claim 8, wherein the control unit determines the absence or presence of a cap closing the laboratory sample container.

* * * * *